United States Patent [19]
Johnson

[11] Patent Number: 5,309,753
[45] Date of Patent: May 10, 1994

[54] APPARATUS AND METHOD FOR DETERMINING THE INERTIA MATRIX OF A RIGID BODY

[75] Inventor: Stanley H. Johnson, Bethlehem, Pa.

[73] Assignee: U.S. Golf Association, Far Hills, N.J.

[21] Appl. No.: 44,942

[22] Filed: Apr. 8, 1993

[51] Int. Cl.$^5$ .............................................. A63B 53/00
[52] U.S. Cl. .................................. 73/65.03; 73/65.01
[58] Field of Search ................. 73/65.01, 65.03, 65.06; 273/167 G, 80 C

[56] References Cited

U.S. PATENT DOCUMENTS

| | | | |
|---|---|---|---|
| 1,953,916 | 4/1934 | Adams | 73/65.03 |
| 2,094,806 | 10/1937 | Murdoch | 73/65.03 |
| 3,473,370 | 10/1969 | Marliniak | 73/65.03 |
| 3,703,824 | 11/1972 | Osborne et al. | 73/65.03 |
| 4,212,193 | 7/1980 | Turley | 73/65.03 |
| 4,603,577 | 8/1986 | Johnson et al. | 73/65.03 |

Primary Examiner—Richard E. Chilcot, Jr.
Assistant Examiner—Elizabeth L. Dougherty
Attorney, Agent, or Firm—Francis C. Hand

[57] ABSTRACT

The experimental determination of the moments of inertia of a rigid body such as a golf-club head about each of three mutually perpendicular axes is described. The club head is suspended so as to swing as a pendulum about an axis that is parallel to each of the axes of interest and the moments of inertia are calculated from the periods of oscillation and physical properties of the body. The products of inertia must be calculated from the moments of inertia in multiple axis systems. Once the inertia matrix is complete, the associated ellipsoid of inertia displays the inertial properties of the rigid body without reference to a specific coordinate system. The inertia ellipsoids of two golf-club heads are determined and compared to demonstrate the procedure.

6 Claims, 5 Drawing Sheets

APPARATUS AND METHOD FOR DETERMINING THE INERTIA MATRIX OF A RIGID BODY

This invention relates to an apparatus and method for determining the inertia matrix of a rigid body such as a golf-club head.

In order to calculate the instantaneous forces and moments required or implied by changes in the general three-dimensional motion of a rigid body, it is necessary to know the complete instantaneous inertia matrix of that body with respect to an inertial axis system. In this respect, it is known that the instantaneous inertia matrix with respect to an inertial reference frame can be calculated from the constant inertia matrix of a rigid body with respect to a body axis system. Usually, the moments of inertia and products of inertia—the elements of the inertia matrix—are computed from detailed information about the geometry and material properties of a rigid body. In some cases, this is a straight-forward process, in others it is laborious and in still other cases, it is virtually impossible.

Consider the problem of computing the changes in linear and angular momentum of a golf-club head caused by striking a golf ball. It is necessary to know the inertia matrix in order to calculate coefficients of restitution from before and after linear and angular velocity measurements. However, it is impractical to compute inertia matrices for modern metal woods since some are hollow; others are foam filled; all have nonuniform wall thicknesses and some have added weights, sole plates, face inserts, and the like. Golf-club heads are not unique. There are many examples of elements of dynamic systems that are made of non-homogeneous or composite materials or manufactured in such a way as to have unknown mass distributions, but have inertia matrices of interest. Consider the rapidly moving parts in computer mass-storage devices, for example, or transport mechanisms in rapid-firing weapons.

BACKGROUND OF THE INVENTION

As is known, short-duration impact processes like golf-club head/golf ball collisions are characterized by coefficients of restitution and friction coefficients which are computed from changes in head and ball linear and angular momenta. While changes in linear momentum are computed from the ball and head mass, changes in angular momentum require accurate knowledge of the club-head inertia matrix, alternatively referred to as the three dimensional inertia tensor. Golf-club heads, like many other irregular rigid bodies with unknown internal mass distributions, are difficult to characterize accurately by calculated inertia parameters.

Generally, little is known is about the significance to the game of golf of one shape versus another. However, there is an expectation that it is the inertia that opposes the torque resulting from an off-center hit. Thus, knowledge of the inertia of a golf-club head should aid in the design of golf-club head for a particular golf-club size.

In the past, various types of techniques have been employed for determining the swing inertia of a golf-club, for example, as described in U.S. Pat. No. 4,603,577, as well as to determine the moment of inertia of a golf-club such as described in U.S. Pat. 4,212,193. However, club head/ball motion before and after collision is generally a three-dimensional motion. As such, the angular momentum cannot be computed from a single moment of inertia as would be the case for two dimensional motion. In the case of bodies with planes of symmetry, it may be possible to compute an entire inertia matrix from three or fewer principal moments of inertia. However, in the absence of symmetry, as in the case of golf-club heads, the three moments of inertia and three products of inertia must be computed or measured. Measurement of moments of inertia about three mutually perpendicular axes can be achieved by replication of the single-axis prior art. There is no comparable way of measuring products of inertia.

If one knows the moments of inertia about each axis of an orthogonal set of axes for multiple sets of orthogonal axes, it can be possible to compute the products of inertia with respect to one of those sets of orthogonal axes. Once the moments and products of inertia are known for any one set of orthogonal axes, they can be computed for any other set of axes. The moments of inertia together with the products of inertia constitute the inertia matrix.

Accordingly, it is an object of the invention to obtain direct measurements of moments of inertia and the indirect determinations of products of inertia so as to permit a complete characterization of the motion of an irregularly-shaped rigid body.

It is another object of the invention to permit the measurement of inertial properties of rigid bodies in cases where inhomogeneity, irregularity or complexity makes computing such properties impractical.

It is another object of the invention to be able to compare the inertial properties of similar objects or the establishment of functional similarity among objects of differing appearances.

It is another object of the invention to be able to determine the inertia matrix of a rigid body in a relatively simple manner.

It is another object of the invention to be able to determine the inertia matrix of a golf-club head.

It is another object of the invention to provide a relatively simple basis for designing golf-club heads.

It is another object of the invention to obtain a graphical representation of an inertia matrix for a golf-club head against which golf-club heads can be matched.

It is another object of the invention to provide an apparatus and procedure to permit the experimental determination of a location of a center of mass and the moments and products of inertia of an irregularly shaped solid body.

Briefly, the invention provides an apparatus and method for determining the inertia matrix of a rigid body. In this respect, the apparatus and method permit an experimental determination of the location of the center of mass and the moments and products of inertia of an irregularly shaped solid body, such as a rigid golf-club head.

The apparatus is comprised of a pair of spaced apart supports, a means removably secured to the beam to receive a known weight thereon and a first adapter for mounting a club head on the balance beam for selectively balancing the club head about a Z-axis extending along a center line of the hosel of the club head relative to the known weight with a face of the club head disposed horizontally in order to determine an x-coordinate of the center of mass of the club head and with the face of the club head disposed vertically to determine a y-coordinate of the center of mass. In addition, the apparatus employs a second adapter for mounting the club head on the beam with the Z-axis perpendicular to the beam for balancing the club head about an X-axis parallel to the face of the club head in order to determine a z-coordinate of the center of mass.

The apparatus also includes a third adapter for mounting the club head on the beam in the absence of the known weight with the Z-axis extending vertically and perpendicularly to the beam in order to obtain moments of inertia $I_{XX}$, $I_{YY}$ about the respective x and y axes of the club head.

The apparatus also includes a fourth adapter for mounting the club head on the beam with the Z-axis extending orthogonally at an angle of 45° relative to the beam to obtain additional moments of inertia $I_{x''x''}$, $I_{z''z''}$.

The method or procedure of the invention permits measurement of the moments of inertia with respect to a base axis system and with respect to three additional axis systems. Like many bodies, golf-club heads have physical features that suggest a base axis system, e.g., the hosel face and centerline. Then the products of inertia in the base axis system can be computed, thereby completing the inertia matrix with respect to an axis system with an origin at the mass center and axes parallel to those of the base axis system. As part of the procedure, it is necessary to locate the center of mass with respect to the base axis system. The same device is adapted to this purpose.

These and other objects and advantages of the invention will become more apparent from the following detailed description taken in conjunction with the accompanying drawings:

Figure 1A:
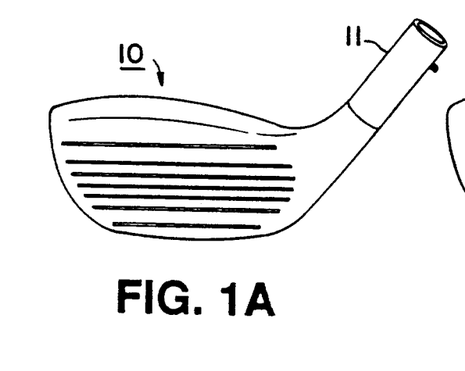
FIG. 1a illustrates a front view of a metal golf-club head.

Referring to FIG. 1a, the metal golf-club head 10, such as a #3 metal wood, includes a hosel 11 of known construction for securing the head 10 to a shaft (not shown) of a golf-club 10 of generally conventional structure.

Figure 1B:
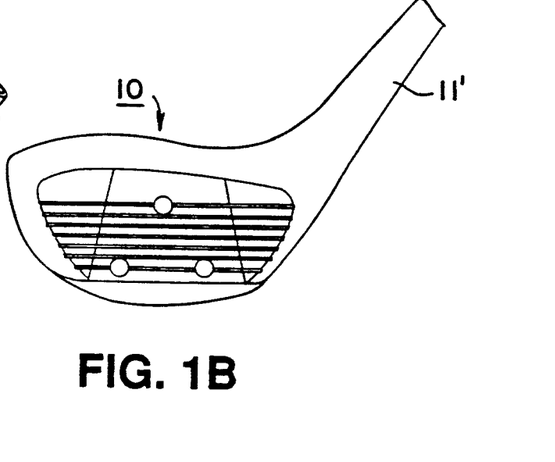
FIG. 1b illustrates a view of a wood golf-club head.

Referring to FIG. 1b, the wood golf-club head 101, such as a #1 wood, of wood has a hosel 11' for securing to a shaft in known manner.

For purposes of the following description, reference will be made to the metal golf-club head of FIG. 1a although the same techniques apply for obtaining the center of mass and moments of inertia for the wood golf-club head 101 of FIG. 1b or any other rigid body of three dimensional shape.

Center of Mass Location

By swinging a rigid body as a pendulum about a fixed axis, it is possible to compute the moment of inertia of the body about the axis of rotation. Then, by using the parallel axis theorem, one can calculate the moment of inertia about an axis through the center of mass and parallel to the axis of rotation.

Figure 2:
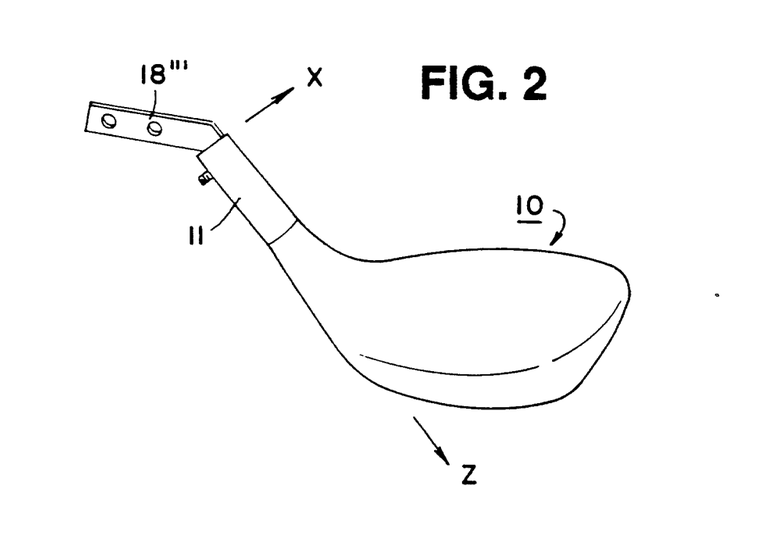
FIG. 2 illustrates a view of the metal golf-club head of FIG. 1a connected with an adapter according to the invention.

Thus, to find the center of mass, a reference coordinate system is established, that is, a set of axes attached to the rigid body is required. As indicated in FIG. 2, the following body-axis system is used here for the golf-club head 10 mounted on the hosel 11:

z-axis = centerline of the hosel 11
xy-plane = plane of the hosel face
x-axis = a line in the xy plane and parallel to the club face of the club head 10
y-axis = completes a righthanded coordinate system.

The origin of this xyz axis system is at the center of the hosel face. The z axis is along the centerline of the hosel 11 and the positive direction is down the shaft from a grip toward the club head 10. The x axis is parallel to the club face and the positive direction is from the heel toward the toe of the club head. The y axis completes a right triad of coordinate axes and must therefore be positive in the face-to-back direction. With this axis system, the coordinates of the center of mass should be three positive numbers.

Figure 3:
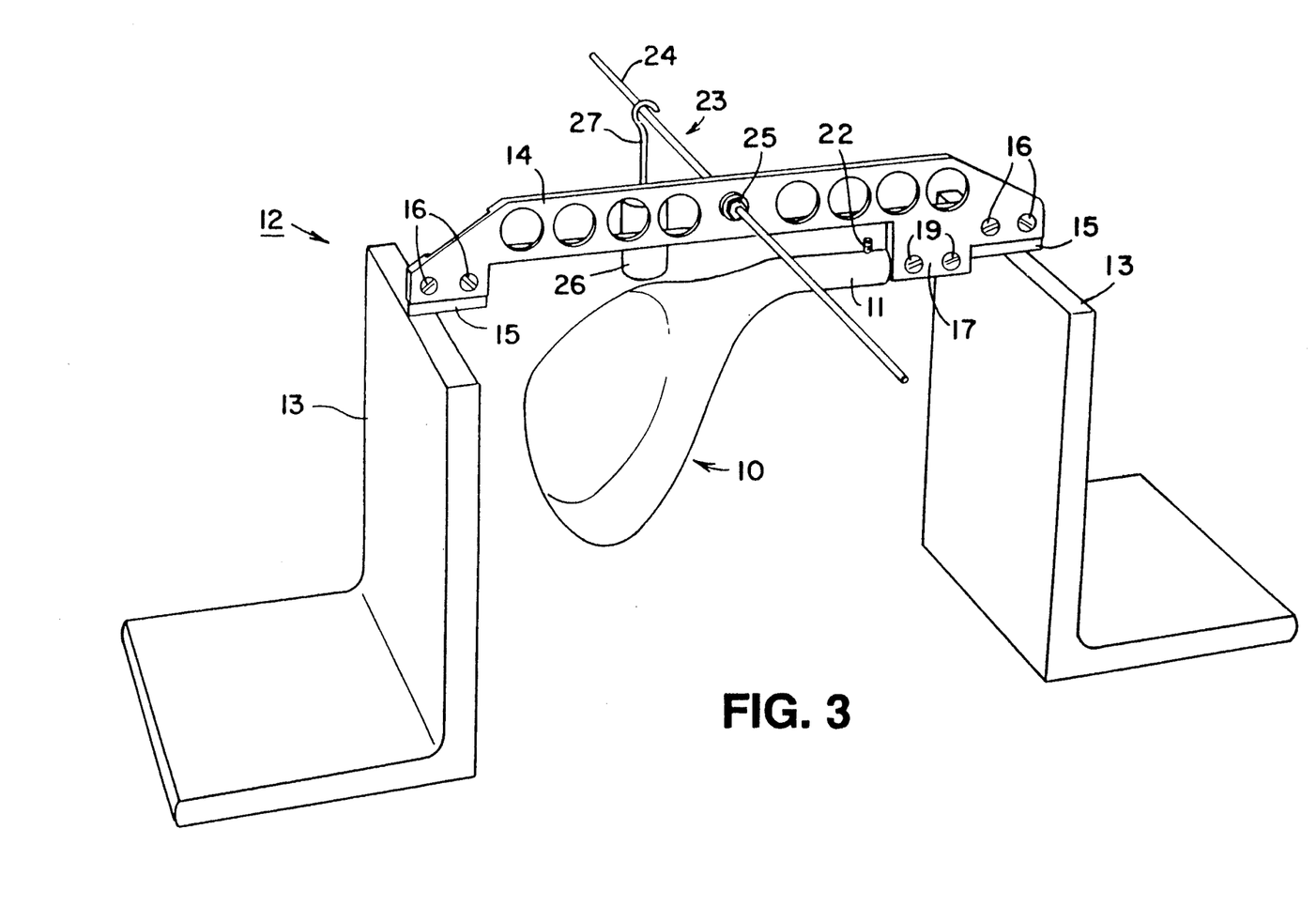
FIG. 3 illustrates a perspective view of an apparatus used to obtain the center of mass location of a golf-club head in accordance with the invention.

Referring to FIG. 3, the apparatus 12 for determining the center of mass of a rigid body includes a pair of spaced apart supports 13, each of which is of L-shape construction, for example, in the form of an angle iron. However, any other suitable support may be used. In addition, the apparatus includes a balance beam 14 which is mounted on and across the supports 13 for pivoting of the beam about an axis extending longitudinally of the beam 14. As indicated, the balance beam 14 is made of aluminum and carries a steel knife edge 15 at each end by which the balance beam 14 is mounted on the respective supports 13 in a balanced upright manner. Each knife edge 15 is secured to the beam, for example, by a pair of machine screws 16 and suitable nuts (not shown). As illustrated, the beam 14 is provided with a plurality of apertures to reduce the tare inertia, however, such is not necessary.

Figure 5A:
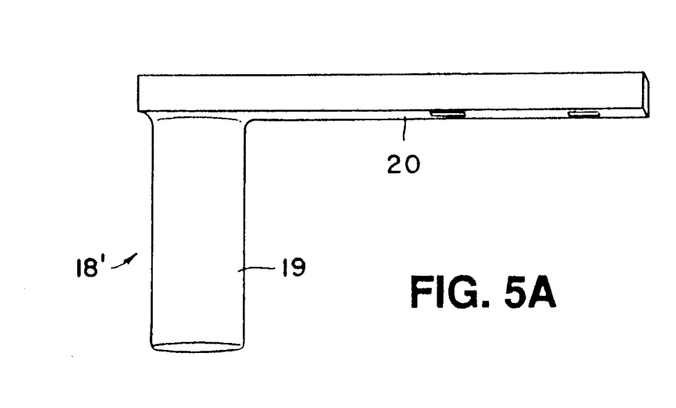
FIG. 5a illustrates a view of one adapter of a set of adapters constructed in accordance with the invention.
Figure 5B:
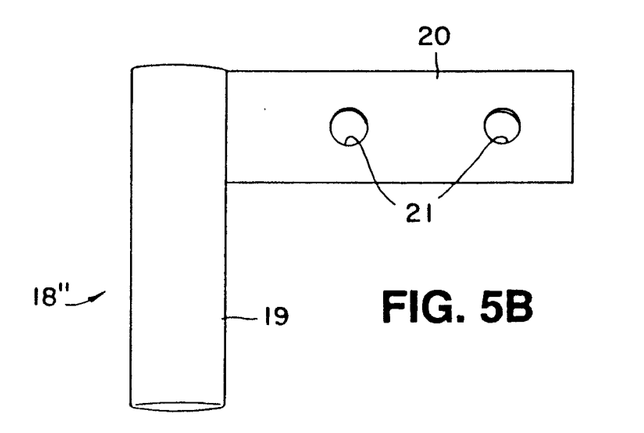
FIG. 5b illustrates a second adapter of a four adapter set utilized by the apparatus according to the invention.
Figure 5C:
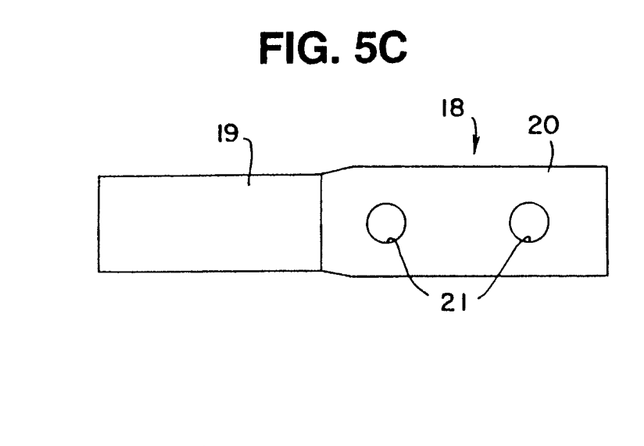
FIG. 5c illustrates a third adapter of the four adapter set.

The beam 14 is constructed with a depending portion 17 to which an adapter 18 (not shown) may be secured. For example, an adapter 18 as illustrated in FIG. 5c is removably mounted on the depending portion 17 by a pair of screws 19 and suitable nuts (not shown). As indicated in FIG. 5c, the adapter 18 includes a cylindrical shank portion 19 and a coaxial mounting portion 20 which is provided with a pair of apertures 21 through which the screws 19 may pass. As indicated in FIG. 3, the hosel 11 of the golf head 10 is slidably mounted over the shank 19 (not shown) and secured thereto as by a set screw 22.

The apparatus also includes a means 23 which is removably secured to the beam 14 to receive a known weight thereon. This means includes a cylindrical bar 24 which is mounted on and secured to the beam 14 in a transverse manner. Suitable locking nuts 25 may be threaded onto threaded portions of the rod 24 on opposite sides of the beam 14 in order to secure the bar in place. In addition, a known weight 26 depends from the rod 24 via a hook 27 which can be slid along the length of the rod 24 during a balancing operation.

As indicated in FIG. 3, when the club head 10 is mounted on the beam 14, the axis of the hosel 11 is below and parallel to the axis of the beam 14. That is, the Z-axis of the club head 10 is below and parallel to the axis of the beam 14.

The club head 10 is balanced about the z axis with the club face horizontal to find the x coordinate of the center of mass. Then the club head 10 is balanced about the z axis with the club face vertical (as illustrated) to find the y coordinate of the center of mass. Finally, the club head 10 is balanced about the x or y axis using an adapter 18' as shown in FIG. 5a, wherein like reference characters indicate like parts as above, to measure the z coordinate of the center of mass. The weights and locations of the centers of mass for the two club heads shown in FIGS. 1, 1A and 1B are given below in Table 1.

TABLE 1

Club-Head Weight and Location of the Center of Mass For Two Representative Woods

| Club head | Weight | x-coord. | y-coord. | z coord |
|---|---|---|---|---|
| #3 Metal | 0.456 lb. | 1.15 in. | 0.72 in. | 3.08 in. |
| #1 Wood | 0.465 lb. | 1.17 in. | 0.22 in. | 3.91 in. |

The z offset is down the shaft centerline from the hosel face, the x offset is along the face of the club and the y offset is into the club head 10 behind the face.

Experimental Determination of Moments of Inertia

Figure 4:
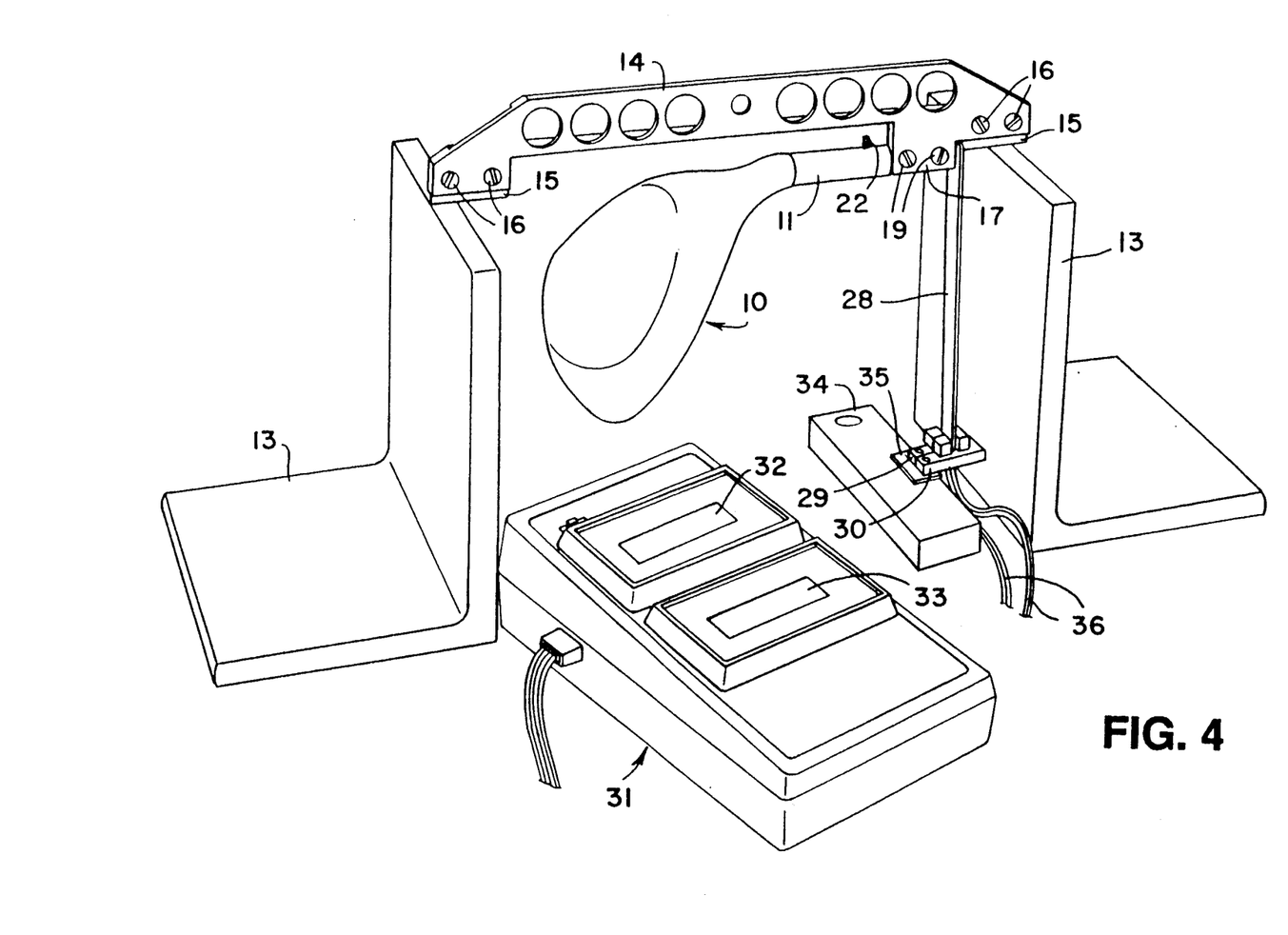
FIG. 4 illustrates a view of the apparatus of FIG. 3 modified to obtain moments of inertia of a golf-club head.

If a rigid body is suspended with a fixed axis of rotation and allowed to swing with small amplitude as a compound pendulum, the moment of inertia about the axis of rotation is $$I = lMg/w^2 \quad (1)$$

where I is the moment of inertia in slug-ft-sqrd, 1 is the distance from the axis of rotation to the center of mass in ft, m is the mass of the rigid body in slugs, g is the acceleration due to gravity in ft/sec-sqrd and w is the undamped natural frequency of oscillation in rad/sec. For larger amplitude swinging, one can derive the equivalent large amplitude relationship or use corrections from a table in Beer, F. P. and E. R. Johnston, Jr. 1984. Vector Mechanics for Engineers—Dynamics, 4th Edition, McGraw-Hill Book Co., New York. This table can be used to adapt equation (1) to large amplitude experiments. Then, the parallel-axis theorem $$I_{kk} = I_{KK} + md^2 \quad (2)$$

can be used to compute the moment of inertia about the KK axis from knowledge of the moment of inertia about the kk axis and the distance from the KK to the kk axis; the KK and kk axes being parallel. In deciding which axis is which, keep in mind that the translation of axes away from the center of mass always increases the moment of inertia. The balancing apparatus is reconfigured into an inertia apparatus as indicated in FIG. 4 wherein like reference characters indicate like parts as above by removing the threaded rod 24 shown in FIG. 3 and the moment of inertia about the z axis, $I_{zz}$, can be determined by measuring the period of oscillation and applying equation (1). Then, the moment of inertia about an axis through the center of mass and parallel to the axis of rotation or Z axis, $I_{ZZ}$, can be computed from equation (2) using the coordinates of the center of mass from Table 1 above.

The apparatus shown in FIG. 4 includes a low-mass opaque flag 28 which is attached to the beam 14 in a more or less vertical manner. As indicated, the flag is about 4" long by ⅜" wide. In addition, the flag 28 is secured to the beam 14 so as to swing in the manner of a pendulum as the club head 10 and beam 14 swing back and forth. In addition, the flag 28 is positioned at the lower end so as to cut across the infrared light paths of two adjacent sensors 29, 30. One sensor 29 functions as a start sensor so as to send a signal to a counter/timer 31 to start a timer the first time the light path associated with the sensor 29 is broken. The counter/timer 31 also has a display 32 to display the time in seconds. The other sensor 30 functions as a count sensor to send a pulse to a counter/timer 31 each time the light path thereof is broken. The counter/timer 31 also has a second display 33 to show the number of pulses. Therefore, the number of oscillations of the beam 14 and club head 10 is the displayed count value minus one and divided by two. Thus, the period of oscillation of the beam 14 and club head 10 is the displayed time value in seconds divided by the number of oscillations.

In practice, the usual number of oscillations per test ranges from 50 when determining the tare inertia of the apparatus up to 200 when measuring the inertia of the apparatus plus a golf-club head 10. As indicated, the two black infrared sensors 29, 30 are mounted on a steel block 34 or any other suitable support, for example, by means of light two-sided tape 35 although any other suitable type of securing means may be used. A cable such as a multi-colored eight wire cable 36 runs from the two sensors 29, 30 to the counter/timer 31. Of note, the steel block 34 may also be used as a test mass with known inertia properties.

The apparatus shown in FIG. 4, with the appropriate adapter, permits the experimental determination of the moments of inertia with respect to three mutually orthogonal axes located at the hosel, $I_{xx}$, $I_{yy}$ and $I_{zz}$, and then the computation of the moments of inertia with respect to three axes with origin at the center of mass and parallel to the axes with origin at the hosel, $I_{XX}$, $I_{YY}$ and $I_{ZZ}$. These are not, in general, principal axes and the products of inertia, $I_{XY}$, $I_{XZ}$ and $I_{YZ}$ are not zero.

Experimental Determination of Products of Inertia

Products of inertia cannot be determined experimentally by the same direct technique used for moments of inertia. However, the products of inertia with respect to one axis system at the center of mass, XYZ, can be computed from the moments of inertia with respect to some other axis system at the center of mass, X'Y'Z'. The direct technique above can be used to determine the moments of inertia in this other axis system.

The inertial elements—moments of inertia and products of inertia—can be represented compactly by the symmetric inertia matrix, [I], for the XYZ axis system, following the sign convention in [2], $$[I] = \begin{bmatrix} I_{xx} & I_{XY} & I_{XZ} \\ I_{XY} & I_{YY} & I_{YZ} \\ I_{XZ} & I_{YZ} & I_{ZZ} \end{bmatrix}$$

and [I]' for any other axis system at the center of mass, where $$[I] = \begin{bmatrix} I_{XX} & I_{XY} & I_{XZ} \\ I_{XY} & I_{YY} & I_{YZ} \\ I_{XZ} & I_{YZ} & I_{ZZ} \end{bmatrix}$$

The inertia matrices in the two axis systems are related by a coordinate transformation matrix, [l], $$[I]' = [l]^T [I] [l] \qquad (3)$$

where $$[l] = \begin{bmatrix} l_{11} & l_{12} & l_{13} \\ l_{21} & l_{22} & l_{23} \\ l_{31} & l_{32} & l_{33} \end{bmatrix}$$

is an orthogonal direction-cosine matrix. The direction-cosine matrix can be thought of as an operator that takes an existing coordinate system and rotates it into a new position, thereby creating a new axis system. Equation (3) relates the inertia matrix in the original coordinate system to the inertia matrix in the new, rotated coordinate system.

In general, it takes three separate, sequential rotations about coordinate axes to move an axis system from one position to an arbitrary other position. Following aircraft industry practice, let the three rotations be rotation about the X axis through a roll angle $\phi$, rotation about the Z axis through a yaw angle $\Psi$, and rotation about the Y axis through a pitch angle $\theta$. The positive directions are defined by the righthand rule. Unfortunately, the overall direction-cosine matrix depends on the sequence of finite rotations taken, so a convention must be established. If a new coordinate system is defined by a yaw, $\Psi$, of the original system followed by a pitch, $\theta$, then a roll, $\phi$, the direction cosine matrix from equation (2) would be $$[l] = \qquad (4)$$

$$\begin{bmatrix} \cos\theta\cos\Psi & \cos\theta\sin\Psi & -\sin\theta \\ \sin\phi\sin\theta\cos\Psi\cos\phi\sin\Psi & \sin\phi\sin\theta\sin\Psi + \cos\phi\cos\Psi & \sin\phi \\ \cos\phi\sin\theta\cos\Psi\sin\phi\sin\Psi & \cos\phi\sin\theta\sin\Psi - \sin\phi\cos\Psi & \cos\phi\cos\theta \end{bmatrix}$$

But consider a coordinate system that results from a yaw alone. The direction-cosine matrix is $$[l]_{yaw} = \begin{bmatrix} \cos\Psi & \sin\Psi & 0 \\ -\sin\Psi & \cos\Psi & 0 \\ 0 & 0 & 1 \end{bmatrix} \qquad (5)$$

and when the matrices in equation (3) are multiplied together, six scalar equations result $$I_{XX}\cos^2\Psi + 2I_{XY}\sin\Psi\cos\Psi + I_{YY}\sin^2\Psi = I_{X'X'} \qquad (7)$$
$$(I_{YY} - I_{XX})\sin\Psi\cos\Psi - I_{XY}\sin^2\Psi + I_{XY}\cos^2\Psi = I_{X'Y'}$$
$$I_{XZ}\cos\Psi + I_{YZ}\sin\Psi = I_{X'Y'}$$

$$I_{XX}\sin^2\Psi - 2I_{XY}\sin\Psi\cos\Psi + I_{YY}\cos^2\Psi = I_{Y'Y'} \qquad (8)$$
$$-I_{XZ}\sin\Psi + I_{YZ}\cos\Psi = I_{Y'Z'}$$
and
$$I_{ZZ} = I_{Z'Z'}.$$

is possible to compute $I_{XY}$ from $I_{X'X'}$, $I_{XX}$ and $I_{YY}$ or from $I_{XX}$, $I_{YY}$ AND $I_{Y'Y'}$, but it is not possible to compute the other products of inertia, $I_{XZ}$ AND $I_{YZ}$, from the available measurements. If $\Psi=45°$, equations (7) and (8) reduce to $$I_{XY} = I_{X'X'} - \frac{(I_{XX} + I_{YY})}{2} \; (a), \qquad (9)$$

$$I_{XY} = \frac{(I_{XX} + I_{YY})}{2} - I_{Y'Y'} \; (b)$$

The right angle adapter 18″ of FIG. 5B, wherein like characters indicate like parts as above, used for the determination of $I_{XX}$ and $I_{YY}$, can be used for the determination of either $I_{X'X'}$ or $I_{Y'Y'}$, and subsequently $I_{X'X'}$ or $I_{Y'Y'}$, by rotating the club head 10 through 45°. Then either of equations (9) can be used to compute $I_{XY}$.

Figure 5D:
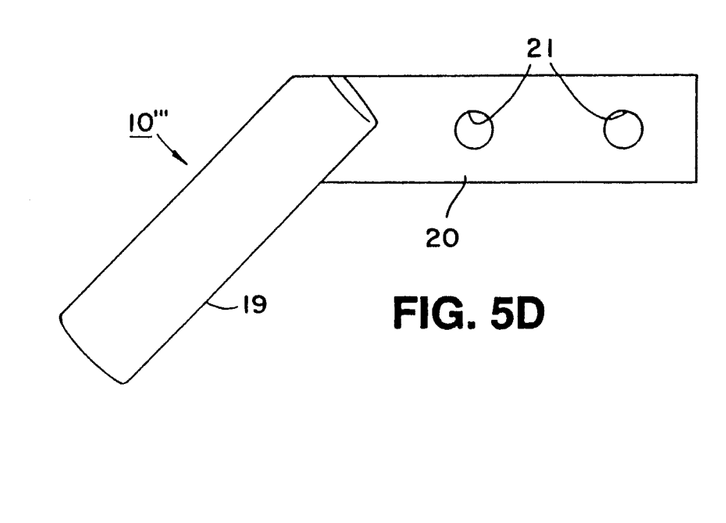
FIG. 5d illustrates a fourth adapter of the four adapter set.

If another coordinate system, X″Y″Z″, is created by pitching the original XYZ axis system through an angle $\theta$, the appropriate direction-cosine matrix is $$[l]_{pitch} = \begin{bmatrix} \cos\theta & 0 & -\sin\theta \\ 0 & 1 & 0 \\ \sin\theta & 0 & \cos\theta \end{bmatrix}$$

and the important two scalar equations resulting from matrix equation (3) are $$I_{XX}\cos^2\theta + 2I_{XZ}\sin\theta\cos\theta + I_{ZZ}\sin^2\theta = I_{X''X''}$$

and $$I_{XX}\sin^2\theta - 2I_{XZ}\sin\theta\cos\theta + I_{ZZ}\cos^2\theta = I_{X''X''} \text{ or and it}$$
is possible to compute $I_{XZ}$ from $I_{XX}$, $I_{ZZ}$ and $I_{X''X''}$ or from $I_{XX}$, $I_{ZZ}$ and $I_{Z''Z''}$. If $\theta=45°$, these two equations reduce to $$I_{XZ} = \frac{(I_{XX} + I_{ZZ})}{2} - I_{Z''Z''} \; (a), \qquad (10)$$

$$I_{XZ} = I_{X''X''} - \frac{(I_{XX} + I_{ZZ})}{2} \; (b)$$

where $I_{X''X''}$ and $I_{Z''Z''}$ can be computed from $I_{X''X''}$ and $I_{Z''Z''}$. The $I_{X''X''}$ and $I_{Z''Z''}$ can be determined experimentally by the direct method above using the adapter 18‴ of FIG. 5D wherein the shank 19 is disposed at a 452 angle to the mounting portion 20. FIG. 2 shows this adapter 18‴ secured to the hosel 11 of the metal club head 10.

Finally, if another coordinate system is defined by rolling the original mass-center XYZ coordinate system through $\phi$ to get an X‴Y‴Z‴ coordinate system, the appropriate direction-cosine matrix is $$[l]_{roll} = \begin{bmatrix} 1 & 0 & 0 \\ 0 & \cos\phi & \sin\phi \\ 0 & -\sin\phi & \cos\phi \end{bmatrix}$$

and it is possible to compute $I_{YZ}$ from $I_{YY}$, $I_{ZZ}$ and $I_{Y'''Y'''}$ or from $I_{YY}$, $I_{ZZ}$ and $I_{Z'''Z'''}$. If $\phi=-45°$, the two alternative equations are $$I_{YZ} = \frac{(I_{YY} + I_{ZZ})}{2} - I_{Y'''Y'''} \; (a), \qquad (11)$$

$$I_{YZ} = I_{Z'''Z'''} - \frac{(I_{YY} + I_{ZZ})}{2} \; (b)$$

The $I_{Y'''Y'''}$ and $I_{Z''Z''}$ can be determined experimentally by the direct method above using the same adapter as in the previous step.

Golf-club Head Examples

The outcomes of the calculations for the two golf-club heads shown in FIGS. 1A and 1B are summarized in Table 2. The club-head inertia parameters for a #3 metal wood and a #1 wood are determined experimentally.

TABLE 2

| INERTIA PARAMETER | ADAPTER OR EQUATION USED | # METAL WOOD slug-ft² | # WOOD slug-ft² |
|---|---|---|---|
| $I_{xx}$ | 90° DOWN | 0.001197 | 0.002084 |
| $I_{yy}$ | 90° DOWN | 0.001313 | 0.001992 |
| $I_{zz}$ | STRAIGHT | 0.000303 | 0.000254 |
| $I_{XX}$ | EQUATION 2 | 0.000093 | 0.000153 |
| $I_{YY}$ | EQUATION 2 | 0.000129 | 0.000167 |
| $I_{ZZ}$ | EQUATION 2 | 0.000122 | 0.000112 |
| $I_{Y'Y'}$ | 90° DOWN | 0.000122 | 0.000178 |
| $I_{XY}$ | EQUATION 9b | −0.000011 | −0.000017 |
| $I_{Z'Z'}$ | 45° DOWN | 0.000043 | 0.000119 |
| $I_{XZ}$ | EQUATION 10a | 0.000065 | 00.000014 |
| $I_{Y'''Y'''}$ | 45° DOWN | 0.000091 | 0.000196 |
| $I_{YZ}$ | EQUATION 11a | 0.000035 | −0.000057 |

The tare inertias of the apparatus are determined experimentally by suspending the beam and adapter from permanent magnets. While the beam is aluminum, the knife edges are steel. There is some magnetic damping and the oscillations decay faster than in the case of upright use of the beam with a club heat attached. The results are given in Table 3.

TABLE 3

Tare Moments of Inertia of the Beam Plus Adapters About the Knife Edge Axis.

| ADAPTER | #3 WOOD ADAPTERS slug-ft² | #1 WOOD ADAPTERS slug-ft² |
|---|---|---|
| STRAIGHT | 0.000011 | 0.000011 |
| 90° DOWN | 0.000032 | 0.000013 |
| 45° | 0.000027 | 0.000012 |

The products of inertia cab be computed from equations 9a or 9b, or 10B, and 11a or 11b. Equations 9b, 10a and 11a were used for Table 2. If the additional data are taken to permit use of equations 9a, 10b and 11b, the agreement with 9b, 10a and 11a indicates the accuracy of the overall procedure. See Table 4.

TABLE 4

Error Indications Obtained for the #3 Metal Wood

| EQUATION | (a) RESULT | (b) RESULT | DIFFERENCE IN % OF $I_{YY}$ |
|---|---|---|---|
| 9 | 0.000005 | −0.000011 | 12.4% |
| 10 | 0.000065 | 0.000041 | 18.6% |
| 11 | 0.000035 | 0.000015 | 15.5% |

Finally, the inertia matrices for the two club heads are $$[I]_{\#3} = \begin{bmatrix} 93 & -11 & 65 \\ -11 & 129 & 35 \\ 65 & 39 & 122 \end{bmatrix} \times 10^{-6} \text{ slug-ft}^2$$

and $$[I]_{\#1} = \begin{bmatrix} 143 & -17 & 14 \\ -17 & 167 & -57 \\ 14 & -57 & 122 \end{bmatrix} \times 10^{-6} \text{ slug-ft}^2$$

The principal moments of inertia are the eigenvalues of the inertia matrices and the principal axis directions are indicated by the eigenvectors. For the #3 metal wood, the principal moments of inertia are $$I_1 = 0.0001829 \quad I_2 = 0.0000311 \quad I_3 = 0001300 \text{ slug-ft}_2$$

and the principal-axis direction cosines with respect to the body axes are $$\epsilon_1 = \begin{bmatrix} 0.506 \\ 0.395 \\ 0.767 \end{bmatrix} \epsilon_2 = \begin{bmatrix} 0.715 \\ -0.305 \\ 0.629 \end{bmatrix} \epsilon_3 = \begin{bmatrix} 0.482 \\ -0.867 \\ 0.128 \end{bmatrix}$$

For the #1 wood, the principal moments of inertia are $$I_1 = 0.0002100 \quad I_2 = 0.0001449 \quad I_3 = 0.0000761 \text{ slug-ft}^2$$

and the principal-axis direction cosines with respect to the body axes are $$\epsilon_1 = \begin{bmatrix} 0.353 \\ 0.798 \\ 0.504 \end{bmatrix} \epsilon_2 = \begin{bmatrix} 0.935 \\ -0.319 \\ 0.155 \end{bmatrix} \epsilon_3 = \begin{bmatrix} 0.038 \\ -0.526 \\ 0.850 \end{bmatrix}$$

Ellipsoids of Inertia

Figure 6:
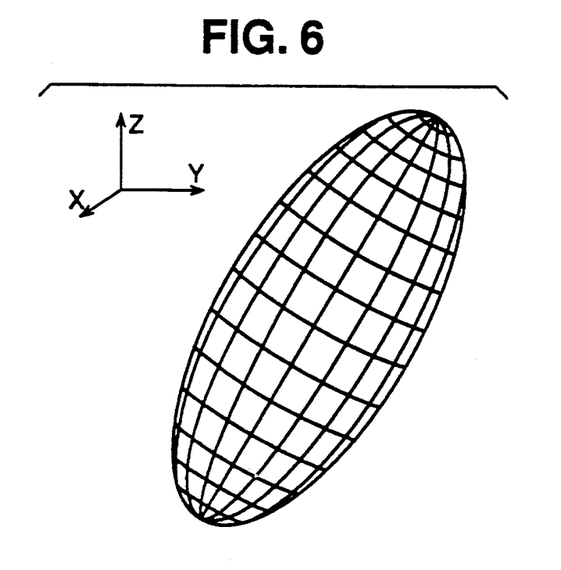
FIG. 6 illustrates a graphical ellipsoid representation of an inertia matrix obtained for a metal golf-club head in accordance with the invention.
Figure 7:
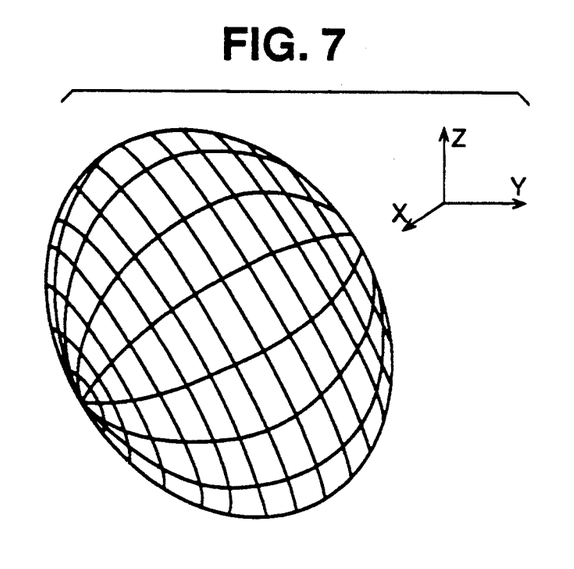
FIG. 7 graphically illustrates a graphical representation of an inertia matrix in ellipsoid form obtained for a wood golf-club head in accordance with the invention.

The inertia ellipsoid is a graphical means of representing the moments of inertia about arbitrary axes with the principal axes being along the axes of the ellipsoid. The inertia ellipsoid is given by Greenwood, D. T., 1988 Principles of Dynamics, Prentice-Hall, Englewood Cliffs, N.J. as $$I_{XX}X^2 + I_{YY}Y^2 + I_{ZZ}Z^2 + 2I_{XY}XY + 2I_{YZ}YZ + - 2I_{XZ}XZ = 1 \quad (12)$$

and is shown in FIG. 6 for the #3 metal wood. FIG. 7 shows the inertia ellipsoid for the #1 wood. The body axes are oriented the same way for both rigid bodies, i.e., both club heads. The weights of the two club heads differ by less than 2%. However, the ellipsoids of inertia differ in shape and orientation. The metal wood (FIG. 1A) is a variable wall-thickness thin shell with the greatest wall thickness at the club face. The wooden club (FIG. IB) is nominally homogeneous with considerable mass added to the horizontal under surface of the club. The sole plate is steel while the insert visible in FIG. IB is of a relatively low density nonmetallic material. So the clubs have similar external geometry, but quite different mass distributions; and this is reflected in the ellipsoids of inertia.

The polar moment of inertia, as defined by Den Hartog, J. P., 1948, Mechanics, McGraw-Hall Book Co., New York, N.Y., of the #1 wood is 26% greater than the polar moment of inertia of the #3 metal wood. The polar radius of gyration is 11% greater for the #1 wood than for the #3 metal wood.

Many of the features of golf-clubs that are emphasized in advertising and other marketing activities are quantifiable by the inertial parameters of the club heads.

Peripheral weighting, heel and toe weights, miss-hit forgiveness, shot self correction, and the like, are expressions of or benefits that are supposed to follow from particular inertia matrices. The apparatus makes possible the determination of the parameters which measure the advertised features and permits valid comparisons.

The invention thus provides an apparatus and procedure for determining the inertia matrix of a rigid body and particularly provides an inertia ellipsoid as a graphical means of representing the moments of inertia about arbitrary axes. Club heads can be fabricated and tested to determined if the inertia matrix falls within the inertia ellipsoid desired.

Since the inertia is understood as opposing the torque resulting from an off-center hit, the inertia ellipsoid can provide an indication of the type of off-center hits which can be tolerated in a club-head. For example, a slender ellipsoid that is horizontal indicates a consideration resistance to rotation when a ball is struck toward the heel or toward the toe from the sweet spot. A slender ellipsoid that is vertical indicates that there is considerable resistance to high or low ball strikes. An ellipsoid that is roughly spherical indicates that the club resists irritation from off-center hits in any direction from the sweet spot more or less equally.

The use of inertia ellipsoids to characterize club-head mass distributions permits quantifiable comparisons and should lead to understanding of the importance of perimeter weighting and center of mass placement so that club design can be more rational than in the past.

The apparatus employs a set of four adapters which can be used with a balance beam arrangement in order to obtain the center of mass of a rigid object and subsequently the moments of inertia of the rigid object relative to various axes of a three-axis system.

What is claimed:

1. An apparatus for determining the inertia matrix of a rigid club head comprising
    a pair of spaced apart supports;
    a balance beam mounted on and across said supports for pivoting about an axis extending longitudinally of said beam;
    means removably secured to said beam to receive a known weight thereon;
    a first adapter for mounting a club head on said balance beam for selectively balancing the club head about a Z-axis extending along a centerline of a hosel of the club head relative to said known weight with a face of the club head disposed horizontally to determine an x-coordinate of the center of mass of the club head and with the face of the club head disposed vertically to determine a y-coordinate of said center of mass; and
    a second adapter for mounting the club head on said beam with said Z-axis perpendicular to said beam for balancing the club head about an X-axis parallel to the face of the club head to determine a Z-coordinate of the center of mass.

2. An apparatus as set forth in claim 1 further comprising a third adapter for mounting the club head on said beam in the absence of said calibrated arm with said Z-axis extending vertically and perpendicularly of said beam to obtain moments of inertia $I_{XX}$, $I_{YY}$ about the respective X and Y axes of the club head and a fourth adapter for mounting the club head on said beam with said Z-axis extending at an angle of 45° relative to said beam to obtain additional moments of inertia $I_{X''X''}$, $I_{Z''Z''}$.

3. An apparatus for determining the inertia matrix of a rigid club head comprising
    a pair of spaced apart supports;
    a balance beam mounted on and across said supports for pivoting about an axis extending longitudinally of said beam;
    means connected to said beam to determine a period of oscillation of said beam with a club head thereon;
    a first adapter for mounting a club head on said balance beam for oscillating the club head about a Z-axis extending along a centerline of a hosel of the club head parallel to said balance beam to determine the moment of inertia $I_{ZZ}$ about said Z-axis; and
    a second adapter for mounting the club head on said beam with said Z-axis extending vertically and perpendicularly of said beam to obtain moments of inertia $I_{XX}$, $I_{YY}$ about the respective X and Y axes of the club head.

4. An apparatus as set forth in claim 1 further comprising a third adapter for mounting the club head on said beam with said Z-axis extending at an angle of 45° relative to said beam to obtain additional moments of inertia $I_{X''X''}$, $I_{Z''Z''}$.

5. An apparatus as set forth in claim 3 wherein said means includes a flag secured to and depending from said beam for oscillation therewith, a first sensor for sensing initiation of an oscillating motion of said flag, a second sensor for detecting subsequent oscillations of said flag during said oscillating motion, and a counter having a first display to indicate a time duration of said oscillating motion and a second display to indicate the number of oscillations of said flag during said oscillating motion.

6. A method of determining the inertia matrix of a rigid body comprising the steps of
    establishing a reference coordinate system for the body having three mutually perpendicular axes (X, Y, Z)
    balancing said body about a reference axis parallel to and in a common vertical plane with one of said axes (Z) with the remaining axes (X, Y) in a vertical plane to obtain a first coordinate of the center of mass of said body;
    balancing said body about said one axis (Z) with said remaining axes (X, Y) in a horizontal plane to obtain a second coordinate of said center of mass;
    balancing said body about said reference axis with said one axis perpendicular to said reference axis to obtain a third coordinate of said center of mass;
    thereafter determining a moment of inertia of said body about each of said axes (X, Y, Z)
    mathematically calculating a moment of inertia ($I_{xx}$, $I_{yy}$, $I_{zz}$) of said body about each axis through said center of mass parallel to said three axes using the parallel-axis theorem $$I_{kk} = I_{KK} + md^2$$

wherein $I_{KK}$ is the moment of inertia about an axis of rotation kk, m is the mass of the body, d is the distance of the center of mass of the body from the kk axis and $I_{KK}$ is the moment of inertia through the center of mass;
    thereafter determining the products of inertia ($I_{XY}$, $I_{XZ}$, $I_{YZ}$) with respect to each said axis passing through said center of mass from said moments of inertia about each said axis and the moments of inertia calculated with respect to a second reference coordinate system (X'Y'Z') at said center of mass;

obtaining an inertia matrix [I] for said body wherein $$[I] = \begin{matrix} I_{XX} & I_{YY} & I_{ZZ} \\ I_{XY} & I_{YY} & I_{YZ} \\ I_{XZ} & I_{YZ} & I_{zz} \end{matrix}$$

calculating three principal moments of inertia of said body from said inertia matrix and principal-axis direction cosines with respect to said axes of said body; and graphically representing said three principal moments of inertia about arbitrary axes with said principal axes being along the axes of an ellipsoid to form an inertia ellipsoid.

* * * * *

UNITED STATES PATENT AND TRADEMARK OFFICE
CERTIFICATE OF CORRECTION

PATENT NO. : 5,309,753
DATED : May 10, 1994
INVENTOR(S) : Stanley H. Johnson It is certified that error appears in the above-identified patent and that said Letters Patent is hereby corrected as shown below:

Column 8, line 31 change "or and it" to -and it-

Line 46 change "452" to -450-

Column 9, line 45 change "cab" to -can-

Signed and Sealed this

Sixteenth Day of August, 1994

Attest:

BRUCE LEHMAN

*Attesting Officer*    *Commissioner of Patents and Trademarks*